(12) United States Patent
Kukuk et al.

(10) Patent No.: US 10,941,541 B2
(45) Date of Patent: Mar. 9, 2021

(54) CRUISE CONTROL ON A WORK MACHINE

(71) Applicant: The Charles Machine Works, Inc., Perry, OK (US)

(72) Inventors: Brant D. Kukuk, Perry, OK (US); Christopher Trimble, Stillwater, OK (US)

(73) Assignee: The Charles Machine Works, Inc., Perry, OK (US)

( * ) Notice: Subject to any disclaimer, the term of this patent is extended or adjusted under 35 U.S.C. 154(b) by 0 days.

(21) Appl. No.: 16/518,072

(22) Filed: Jul. 22, 2019

(65) Prior Publication Data

US 2020/0032480 A1 Jan. 30, 2020

Related U.S. Application Data

(60) Provisional application No. 62/703,738, filed on Jul. 26, 2018.

(51) Int. Cl.
| | | |
|---|---|---|
| *E02F 9/20* | (2006.01) | |
| *G05G 9/02* | (2006.01) | |
| *G05G 5/00* | (2006.01) | |
| *G05D 9/04* | (2006.01) | |
| *F16H 61/47* | (2010.01) | |
| *G05G 9/047* | (2006.01) | |

(52) U.S. Cl.
CPC ............ *E02F 9/2012* (2013.01); *G05D 9/04* (2013.01); *G05G 5/005* (2013.01); *G05G 9/02* (2013.01); *F16H 61/47* (2013.01); *G05G 2009/0474* (2013.01)

(58) Field of Classification Search
CPC ........... E02F 9/2012; G05D 9/04; G05D 9/02; G05G 5/005; F16H 61/47
See application file for complete search history.

(56) References Cited

U.S. PATENT DOCUMENTS

| | | | |
|---|---|---|---|
| 5,168,970 A | 12/1992 | Hough et al. | |
| 7,500,530 B2 | 3/2009 | Wheeler | |
| 7,549,500 B2 | 6/2009 | Graham et al. | |
| 9,303,761 B2 | 4/2016 | Storey | |
| 9,327,635 B2 * | 5/2016 | Scheck | B60Q 1/40 |
| 9,713,307 B1 | 7/2017 | Raszga et al. | |
| 10,114,404 B2 | 10/2018 | Kukuk et al. | |
| 10,207,732 B2 * | 2/2019 | Schlanzke | B60Q 1/1469 |
| 2019/0069468 A1 | 3/2019 | Kukuk et al. | |

OTHER PUBLICATIONS

Mag Throttle Store "World's best throttle lock cruise control." printed from website Jun. 20, 2019, 5 pages.

* cited by examiner

*Primary Examiner* — Thomas C Diaz

(74) *Attorney, Agent, or Firm* — Tomlinson McKinstry, P.C.

(57) ABSTRACT

A cruise control system for work machines. The system comprises one or more levers for controlling the velocity of the work machine and one or more magnet assemblies. The magnet assemblies comprise means of overcoming the neutral bias of a control lever so that the velocity of the work machine may be maintained without manual input from the operator. The magnets may act directly upon a control lever or a surface adjacent a control lever. Additional controls may be employed to set a maximum cruising speed for the work machine when cruise control is engaged.

29 Claims, 15 Drawing Sheets

CRUISE CONTROL ON A WORK MACHINE

SUMMARY

The present invention is directed to a system comprising a work machine. The work machine comprises a control assembly. The control assembly comprises a lever, a rotating component, and a non-rotating component. The lever is configured to control an operating parameter of the work machine. The lever has a range of motion around a neutral position and a bias toward that neutral position. The rotating component is carried by or included within the lever. The non-rotating component maintains a face to face relationship with at least a portion of the rotating component throughout the lever's range of motion. A selected one of the rotating and non-rotating components is an electromagnet having a field strength sufficient, when actuated, to engage the unselected one of the components and overcome the bias of the lever. The unselected one of the rotating and non-rotating components is a body of ferromagnetic material The present invention is also directed to a system. The system comprises a work machine, a control assembly, a first electromagnet, and a second electromagnet. The work machine comprises first and second independently operated motive force elements. The control assembly comprises first and second manual control elements and one or more non-rotating components. The first and second manual control elements are configured to control one of the first and second motive force elements. Each manual control element has a range of motion around a neutral position and a bias toward that neutral position. The non-rotating components are in face-to-face relationship with at least a portion of the first and second manual control elements through its range of motion. The first and second electromagnet are carried by or included in the non-rotating component or one of the manual control elements. The electromagnets have a field strength sufficient, when actuated, to overcome the bias of the manual control elements.

DETAILED DESCRIPTION

Figure 1:
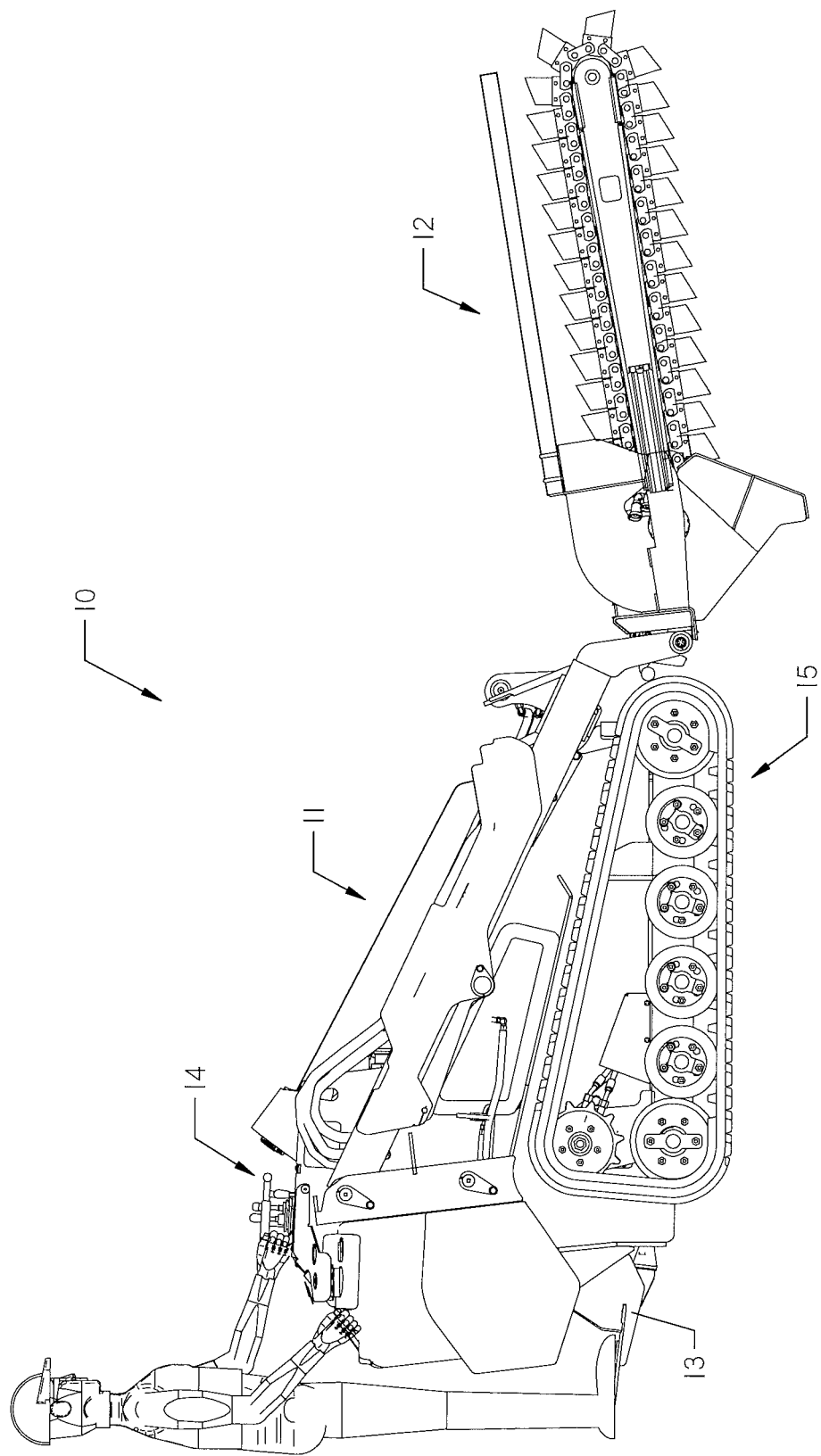
FIG. 1 is a side view of a work machine having an operator platform.

FIG. 1 illustrates a common work machine 10. The work machine 10 comprises a chassis 11 and an attachment 12. For illustrative purposes, a trencher attachment 12 is shown, but other attachments, such as vibratory plows, buckets, microtrenching assemblies, excavator arms, and the like, may be utilized in conjunction with the chassis 11.

An operator of the work machine 10 stands on a platform 13 located at a first end of the machine 10. A control panel 14 is positioned above the platform 13 for an operator to use. The control panel 14 comprises controls, as disclosed in FIG. 2, which operate the machine 10 and control its associated attachment 12. The platform 13 may incorporate a treaded surface or a coarse coating to prevent the operator from slipping off while the machine 10 is moving. The chassis 11 shown utilizes two tracks as a ground engagement system 15, but other ground engagement systems such as wheels, steerable track assemblies, or a combination of both could be employed based on the demands of the particular application.

An operator using the work machine 10 in a plowing or trenching operation has two primary tasks: ensuring that the attachment is properly uncovering a trench, and operating the ground engagement system 15 to determine the path of the trench. Usually, a work machine 10 with an operating attachment 12 is moving in the direction of the first end or platform 13. An operator, uncovering a trench, will utilize one control to operate the attachment 12, and another to control the ground engagement system 15.

An operator may wish to place the ground engagement system 15 of the work machine 10 in cruise control in order to focus on other activities, such as controlling the attachment 12. Cruise control, as used herein, refers to a constant power provided to the ground engagement system 15 without any action of the operator, such that the ground speed and direction remains approximately constant.

Figure 2:
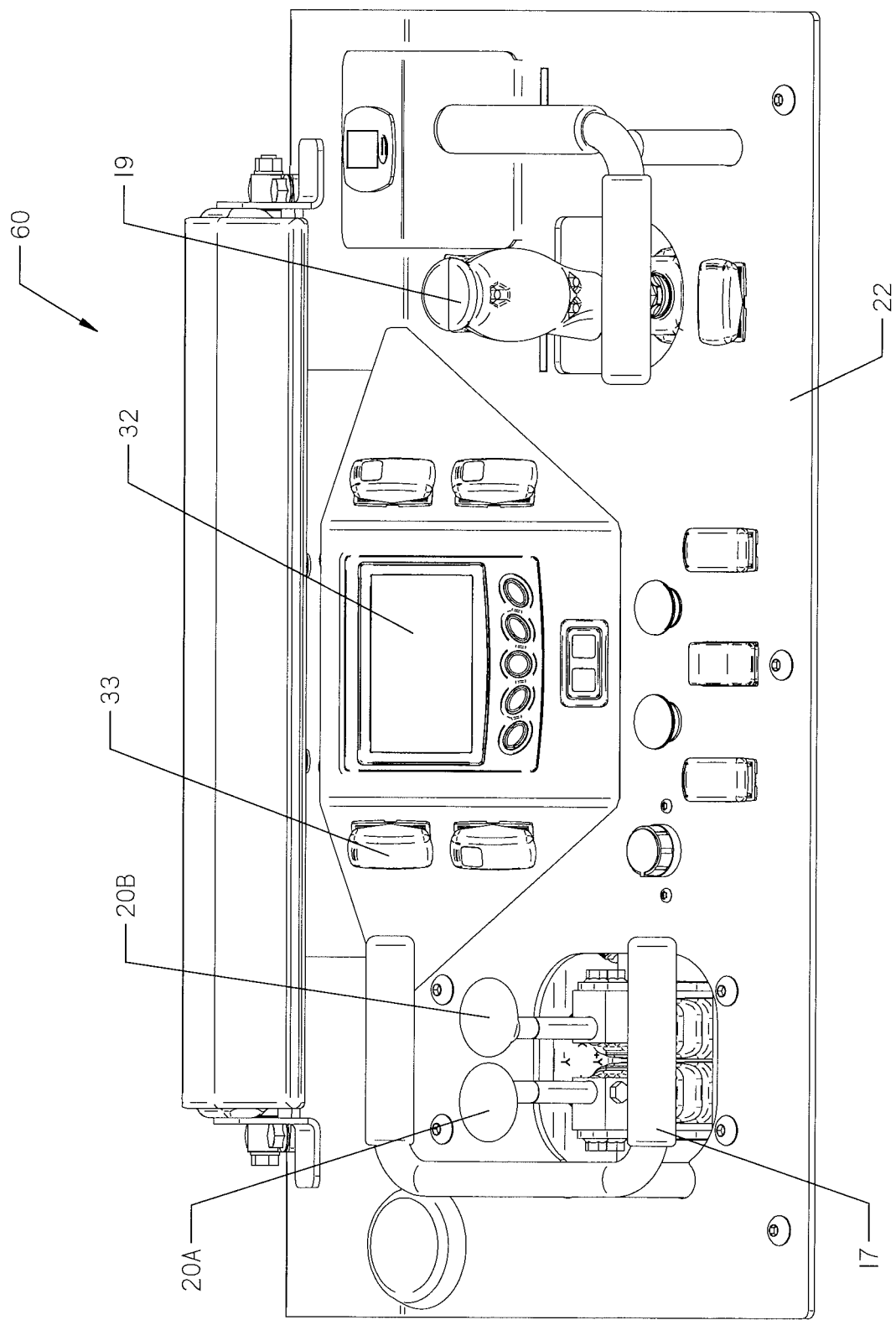
FIG. 2 shows an operator control panel for use with the work machine of FIG. 1.

Turning to FIG. 2, the control panel 60 comprises a body 62 upon which a plurality of controls may be located to perform a variety of actions. These actions may include piloting the work machine 10, controlling attachments 12, and engaging and disengaging the cruise control system. As shown in FIGS. 2-8, the ground engagement system 15 of the work machine 10 is controlled by a dual steering lever assembly 17 mounted to the control panel body 62.

The lever assembly 17 comprises a first lever 20A and a second lever 20B. Each of the dual levers 20A, 20B controls an associated track. The levers 20A, 20B are bidirectional such that the work machine 10 can be operated in the forward and reverse directions. The work machine 10 shown in FIG. 1 is a "skid steer", meaning that direction can be changed by operating one track at a higher rate than the other track.

The operator may engage and disengage the cruise control feature by manipulating an actuator such as cruise control switch 33, though other control mechanisms may be utilized. An attachment operation lever 19 (FIG. 2) allows for operation of the work machine attachment 12 through manual manipulation. Other controls and displays may also be present on the control panel 60 to facilitate the performance and observation of various functions dictated by the design of the particular work machine employed and the needs of the project.

Figure 3:
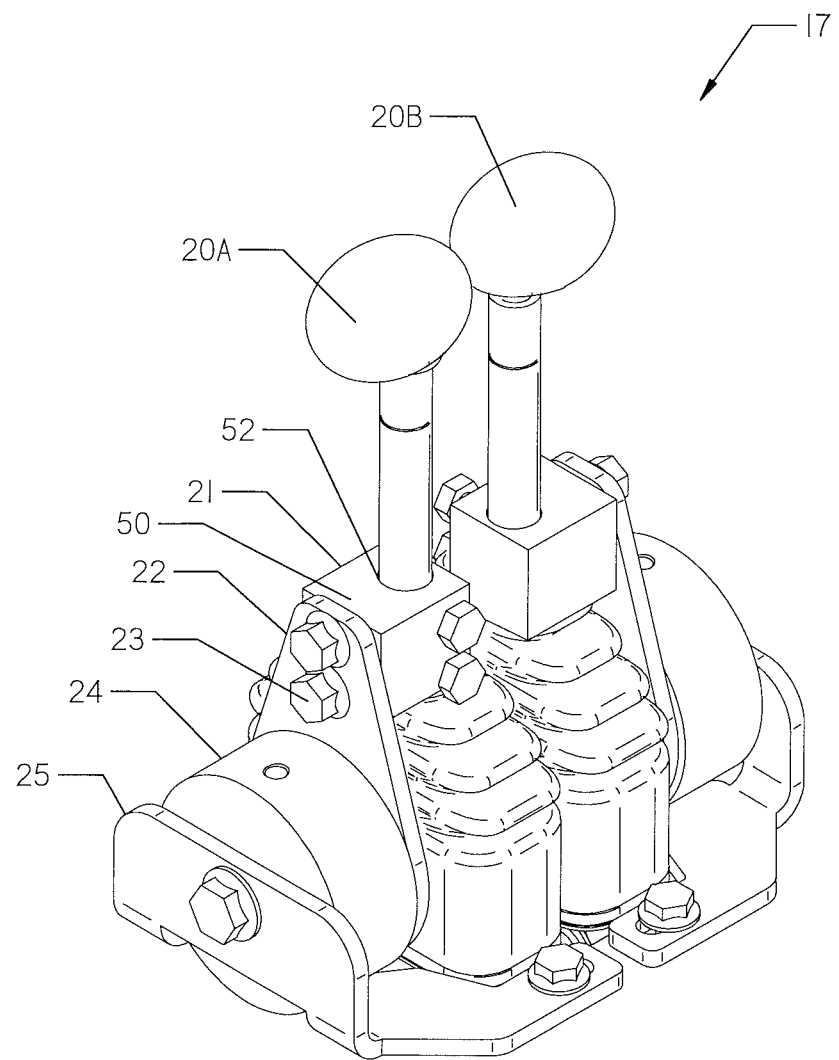
FIG. 3 is an enlarged perspective view of the dual lever controls installed on the control panel shown in FIG. 2. The levers are in their neutral position.
Figure 4:
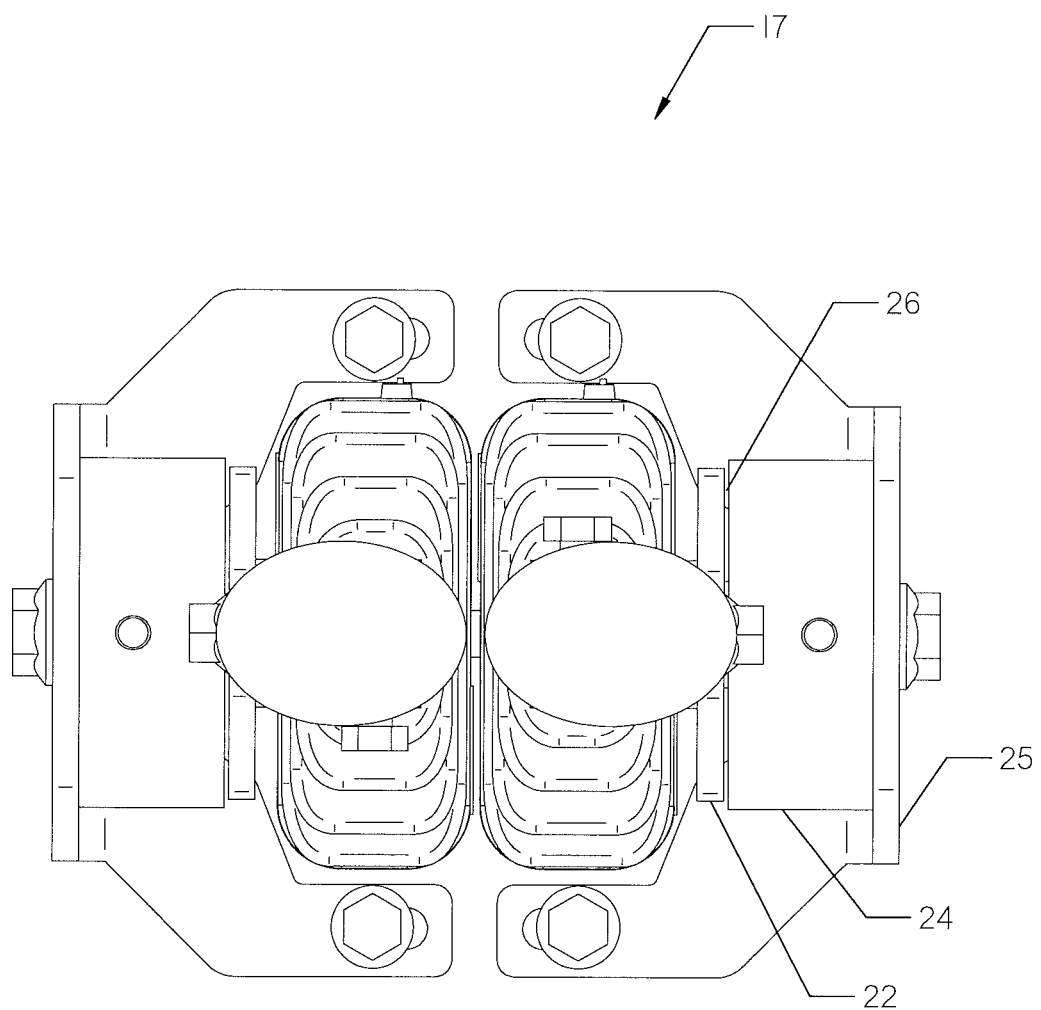
FIG. 4 is a top plan view of the dual lever controls shown in FIG. 3.

In FIG. 3, the dual steering lever assembly 17 is shown in a "neutral" condition. Dual-lever steering assemblies 17 are used in certain work machine configurations because they allow the operator to independently control the ground engagement system 15 on each side of the machine 10. Each lever 20A, 20B is manually moveable in at least a first and second direction, with movement in the first or second direction generating forward or aft movement of the ground engagement system 15 on a corresponding side.

The levers 20A, 20B are biased to a neutral position along their range of movement such that they will return to that position if not manually engaged by the operator. At the neutral position, the ground engagement system 15 is not engaged, and the work machine 10 will ultimately cease movement when the levers 20A, 20B are in neutral. As shown in FIGS. 3-8, each steering lever 20A, 20B comprises a cruise block 21. For clarity, the cruise block 21 associated with left lever 20A will be discussed. The cruise block 21, comprises a body 50 and an internally disposed hole 52 through which the lever 20A passes. The cruise block 21 further comprises a magnetic plate 22 affixed to the cruise block 21 on a side opposite the adjacent lever 20B.

The magnetic plate 22 is affixed to the cruise block 21, and the cruise block 21 is affixed to the lever 20A, by way of fasteners 23, though other connectors such as bolts, screws and the like may be employed. The magnetic plate 22 may comprise iron, though nickel, cobalt, other ferromagnetic materials, or combinations thereof, may be utilized so long as the magnetic plate 22 is of sufficient rigidity to hold the lever 20A in place when cruise control is activated.

Once affixed to a lever 20A, 20B, each magnetic plate 22 rotates in unison with that lever 20A, 20B and provides a surface for engagement with an associated electromagnet 24. Each electromagnet 24 is held in close proximity to its associated magnetic plate 22 by a flexible retainer bracket 25. In some embodiments, the electromagnets 24 are positioned such that the axis of rotation of the levers 20A, 20B and the magnetic plates 22 extends through the electromagnets 24.

The same bracket 25 may hold two electromagnets 24, or separate, similar brackets 25 may be utilized on each side of the levers 20A, 20B. Each of the one or more brackets 25 are attached to the control panel body 62 where the steering levers 20A, 20B meet the control panel 60. When activated, each electromagnet 24 attracts and engages a corresponding magnetic plate 22 to overcome the neutral bias of the control levers 20A, 20B.

Alternative embodiments include those where the cruise blocks 21 and magnetic plates 22 are eliminated and each electromagnet 24 acts directly on a lever 20A, 20B to maintain its position, as well as embodiments where a rigid retainer bracket 25 is employed and each electromagnet 24 is in continuous contact with a magnetic plate 22 or lever 20A, 20B. Other alternative embodiments include those where the electromagnets 24 are affixed to and rotate with the levers 20A, 20B, and the magnetic plates 22 are non-rotatably retained by the bracket 25.

Figure 7:
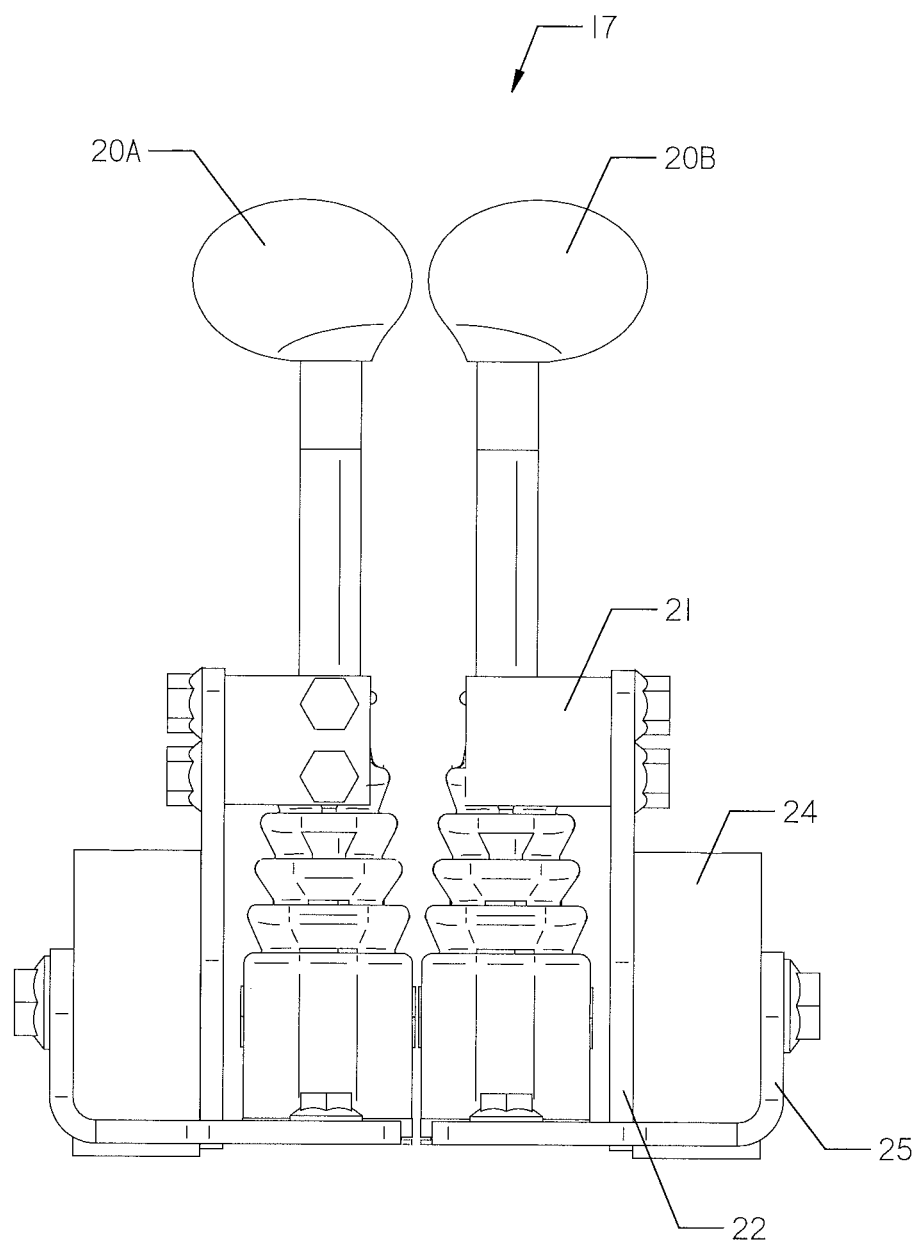
FIG. 7 shows the dual lever controls of FIG. 6 after the cruise control system has been activated.

As shown best in FIGS. 4-7, a narrow gap 26 exists between each electromagnet 24 and its associated magnetic plate 22. Activation of the electromagnets 24 may establish a magnetic force sufficient to flex the retainer bracket 25, causing the electromagnets 24 to move toward and engage the magnetic plates 22, eliminating the gap 26 as shown in FIG. 7.

Cruise control may be activated while the levers 20A, 20B are at any position. The magnetic force applied is of sufficient strength to overcome the neutral bias of the levers 20A, 20B while also allowing the operator to adjust the levers in a first or second direction without deactivating the electromagnets 24. This is beneficial because it allows the operator to make small adjustments to speed and steering angle as may be needed while operating an attachment 12.

Figure 5:
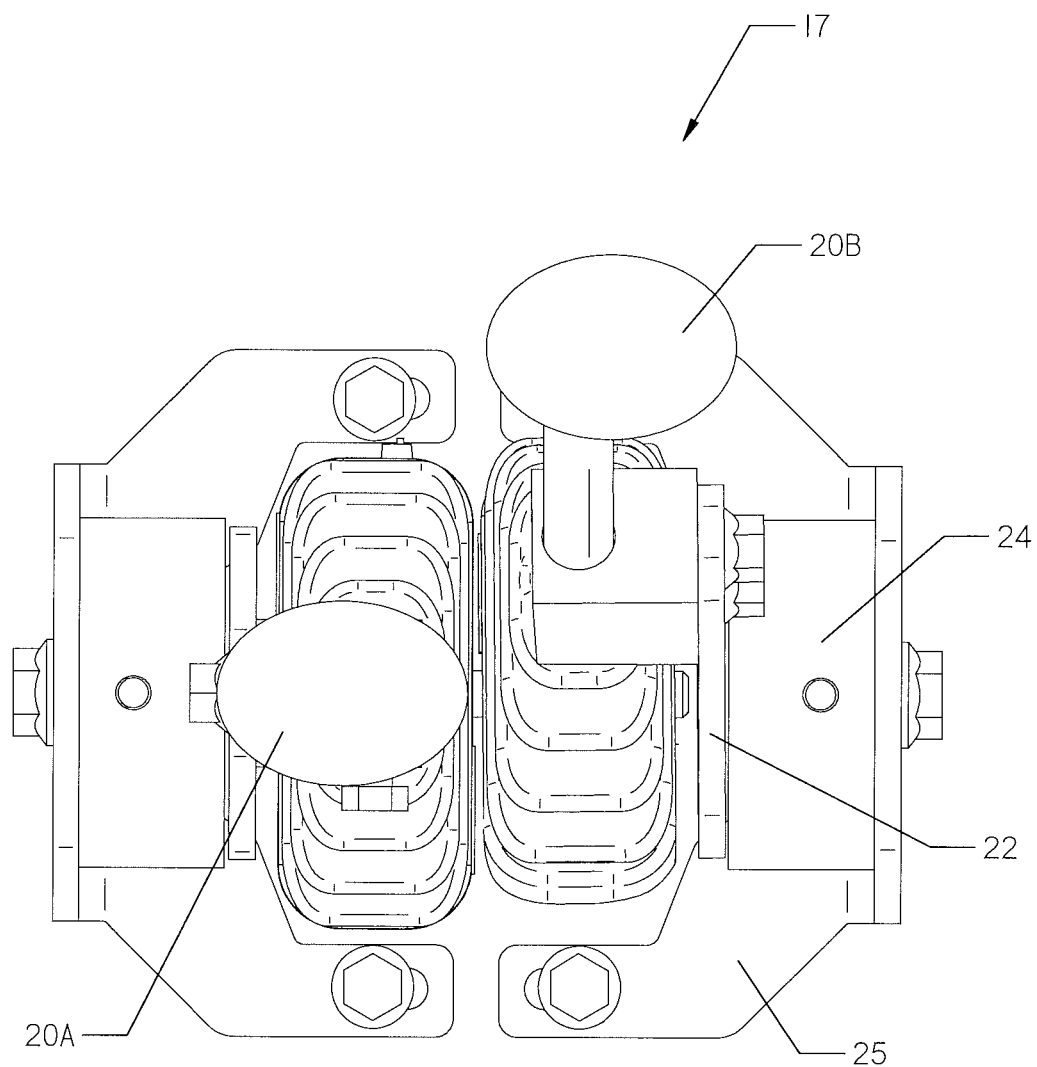
FIG. 5 is a top plan view of the dual lever controls shown in FIG. 3. The right lever has been shifted to a forward cruise position.
Figure 6:
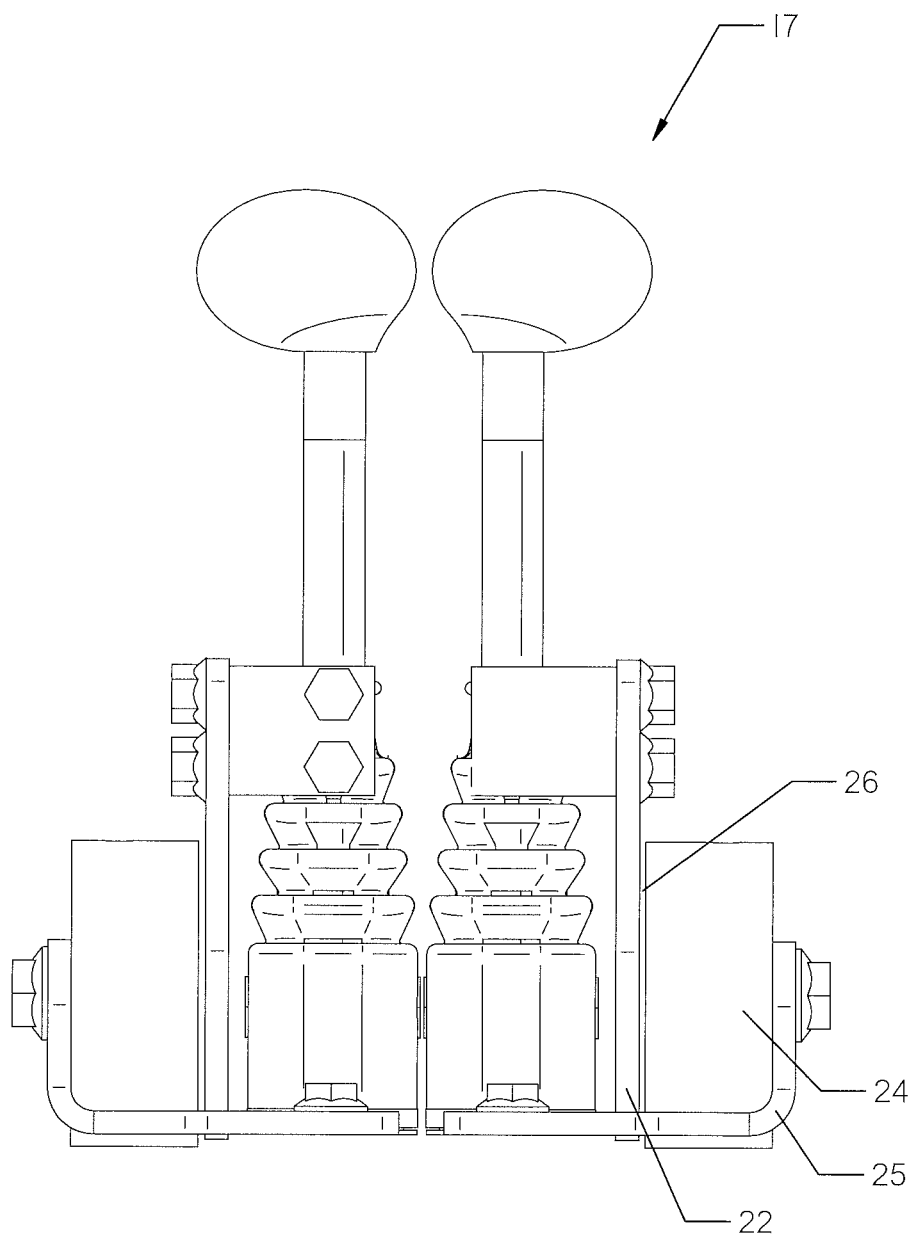
FIG. 6 is a front elevation view of the dual lever controls shown in FIG. 3. The cruise control system is not activated.

FIG. 5 shows an example of such use of the system. As the operator adjusts the levers 20A, 20B, the magnetic plates 22 rotate axially on their respective electromagnets 24 while maintaining engagement. Alternatively, the retainer bracket 25 is rigid and maintains the electromagnets 24 in engagement with the magnetic plates 22 or levers 20A, 20B regardless of whether cruise control is activated.

Figure 8:
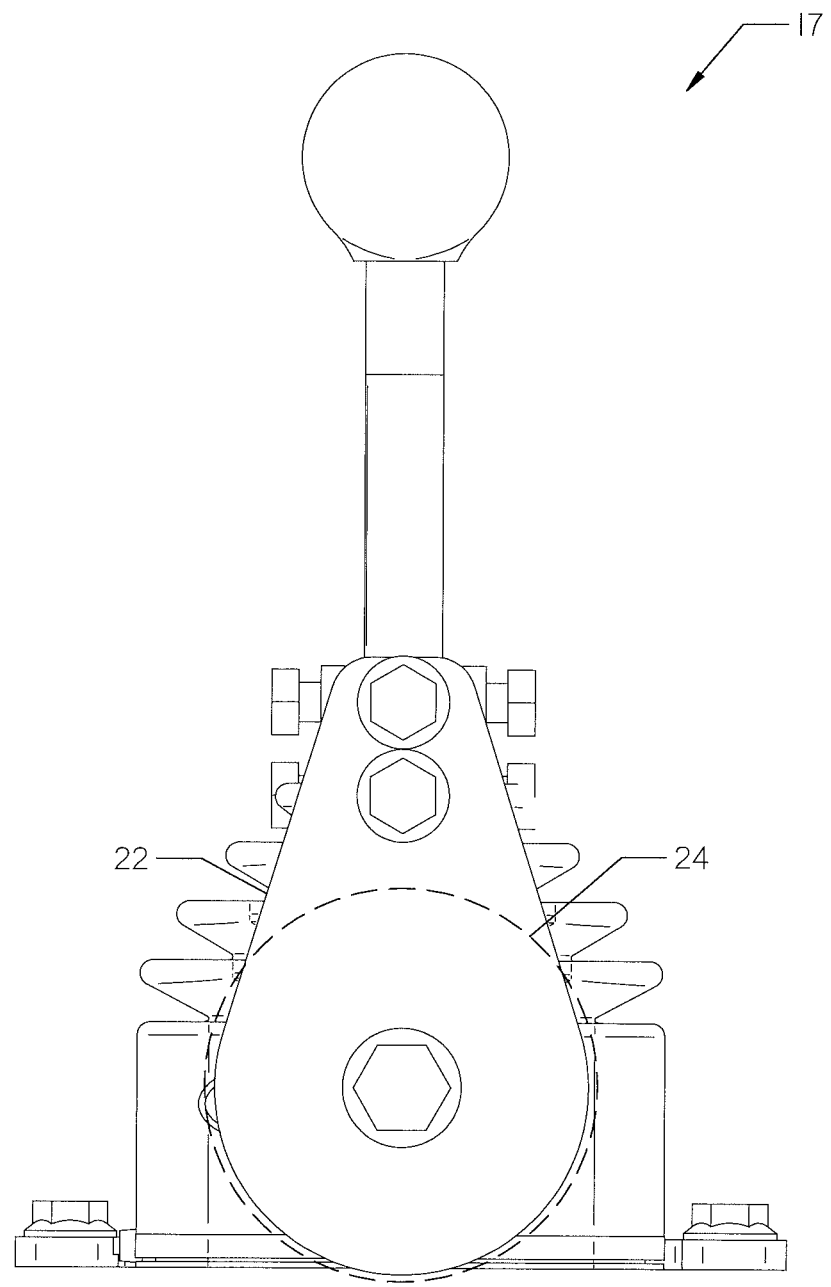
FIG. 8 is a side elevation view of the dual lever controls shown in FIG. 3. The bracket is omitted and the electromagnet is shown with dashed lines.

In FIG. 8, the dual lever assembly 17 is shown from the side and an outline of the electromagnet 24 illustrates the alignment between the electromagnet 24 and the magnetic plate 22 with the retainer bracket 25 hidden for clarity. As shown, the magnetic plates 22 have a teardrop shape. This shape enables the magnetic plate 22 to fully engage its associated electromagnet 24, regardless of how the lever 20A, 20B is positioned. In addition, the shape allows the magnetic plate 22 to move in tandem with the lever 20A, 20B without contacting the retainer bracket 25 or otherwise interfering with lever operation.

Other shapes could be employed to the same effect without departing from the spirit or function of the present invention. Furthermore, the magnetic plate 22 may be absent altogether in embodiments where the electromagnet 24 acts directly on the lever 20A, 20B.

Figure 13:
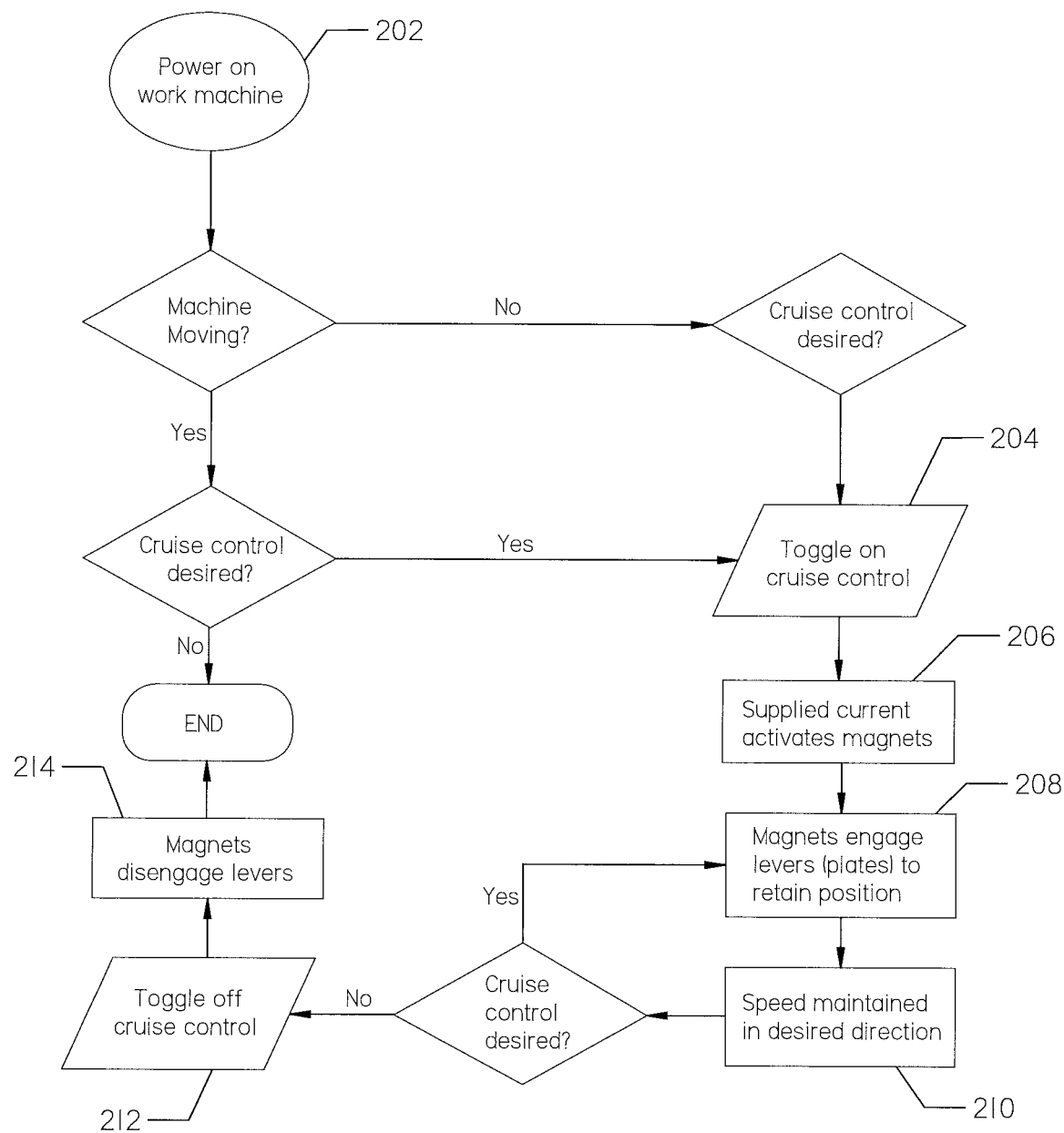
FIG. 13 is a diagrammatic representation of operating logic for a cruise control system using a dual lever control.

Illustrative operating logic for a cruise control system using a dual steering lever assembly 17 is shown in FIG. 13. First, the work machine 10 is powered on at step 202. At step 204 the operator may toggle the switch 33 to activate cruise control whether the machine 10 is moving or idle. Once toggled, the electrical system of the work machine 10 supplies current to the electromagnets 24, causing them to generate magnetic force at 206. The electromagnets 24 then engage the magnetic plates 22 or levers 20A, 20B and retain their current position at 208. Because the dual lever assembly 17 governs the speed and direction of the work machine 10, maintaining the position of the levers 20A, 20B has the effect of maintaining the velocity of the work machine at 210.

Factors external to the work machine such as slopes and terrain characteristics may alter velocity regardless of the position of the levers 20A, 20B under cruise control. The operator may wish to manually engage the levers 20A, 20B to change velocity as appropriate. However, because this embodiment of the present invention imparts magnetic holding force on the levers 20A, 20B throughout their range of motion, these adjustments may be made ad hoc, without the need to disengage the cruise control system. The field strength of the activated electromagnets 24 may be small enough so as to allow the levers 20A, 20B to be rotated manually. At any point where cruise control is no longer desired, such as when the operator wishes to park and depart the machine 10, it may be deactivated by toggling off the switch 33 at 212, at which point the electromagnets 24 will disengage and the levers 20A, 20B will naturally return to a neutrally-biased position at 214.

In an alternative embodiment shown in FIGS. 9-12, the ground engagement system 15 is actuated by a joystick 30.

Figure 9:
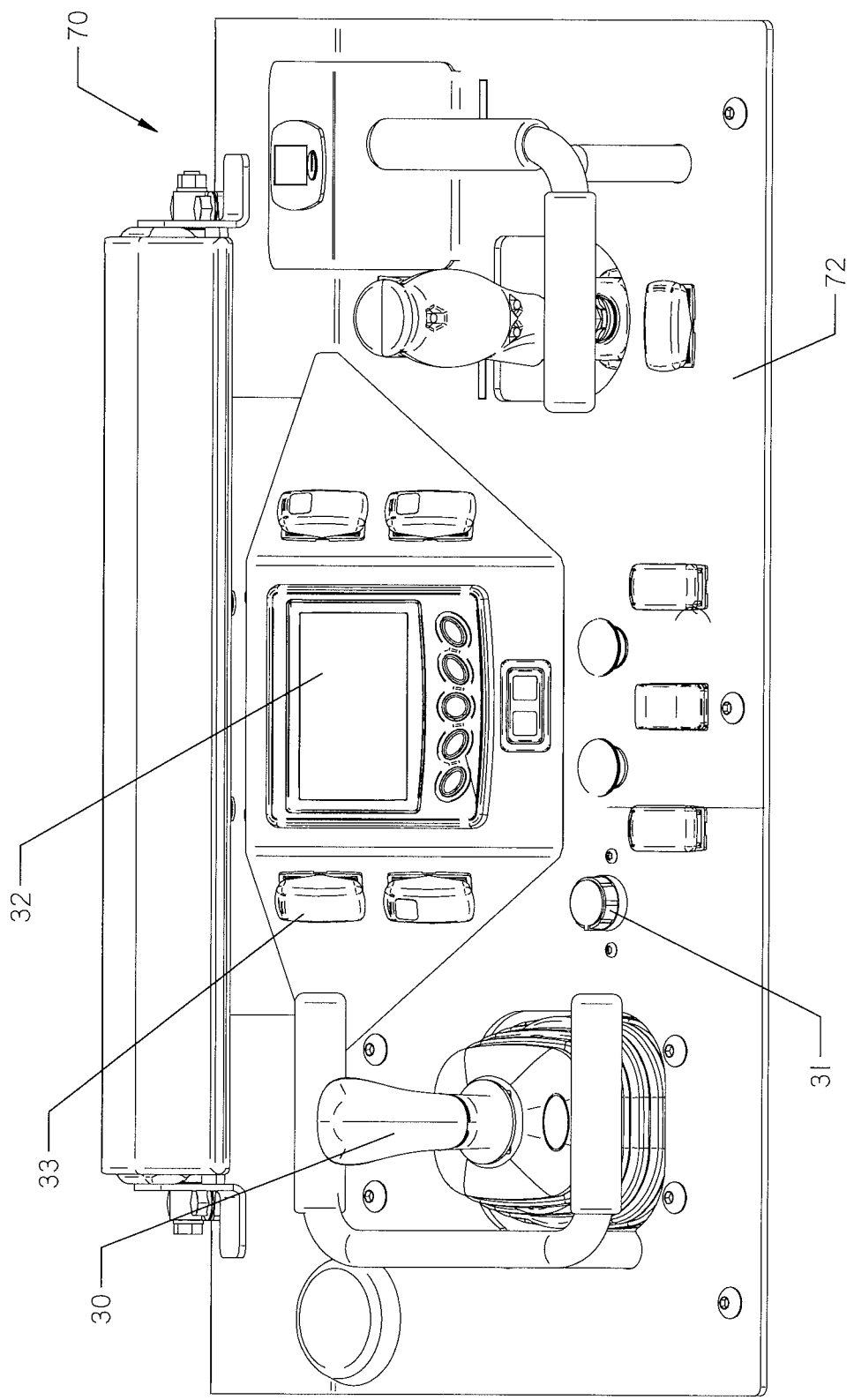
FIG. 9 shows another embodiment of an operator control panel for use with the machine of FIG. 1.
Figure 10:
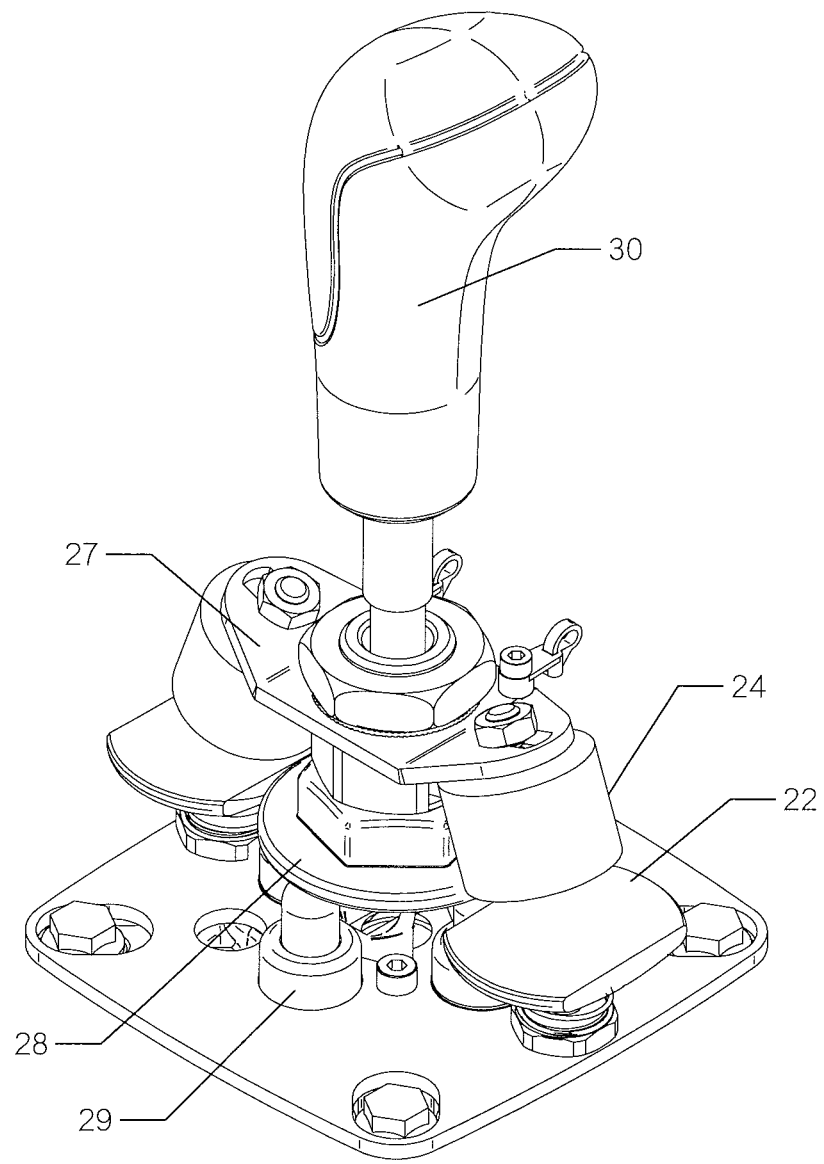
FIG. 10 is an enlarged perspective view of the joystick control installed on the control panel shown in FIG. 9. The joystick is in its neutral position.
Figure 11:
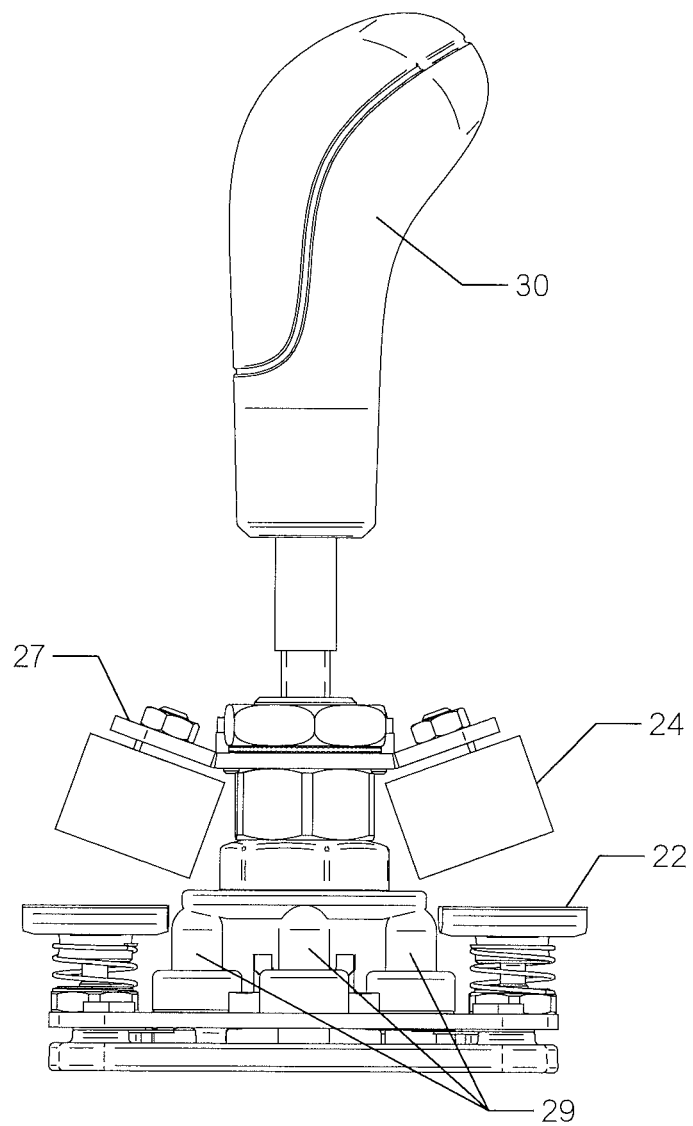
FIG. 11 is a side elevation view of the joystick control shown in FIG. 10.
Figure 12:
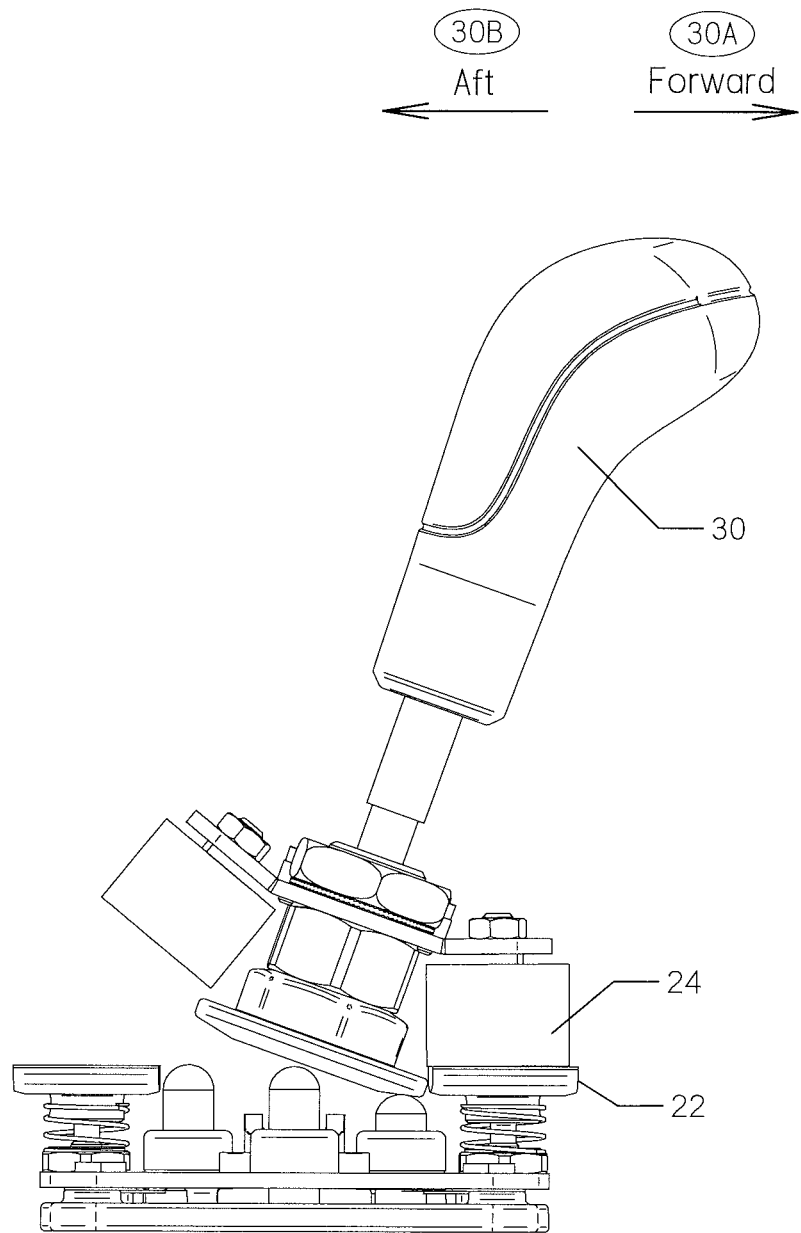
FIG. 12 shows the joystick control of FIG. 11 after the control has been shifted to a forward cruise position.

The joystick 30 has two axes of freedom, and a control assembly (not shown) converts the position of the joystick into speed settings for the ground engagement system 15 of the work machine 10. With reference to FIGS. 9-12, a single joystick 30 may control the ground engagement system 15 of the work machine 10. FIG. 9 shows an operator control panel 60 wherein the joystick 30 is disposed at the body 72 of the control panel 70.

The joystick 30 sits atop a valve plate 28 that actuates one or more of four steering valves 29 when the joystick 30 is tilted in a given direction. The joystick 30 is biased towards a neutral position, and will return to the neutral position when released by the operator unless cruise control is active. Other joystick configurations, such as those incorporating ball-and-pin structures that actuate potentiometers, could be employed. Some configurations may incorporate a gate that partially encloses the joystick, and the inner contours of the gate serve to restrict the movement of the joystick. To the extent those configurations would function appropriately in the present invention, they are incorporated herein by reference.

Returning to FIG. 10, the joystick 30 extends through a cruise plate 27 with angled opposing forward and aft ends. Electromagnets 24 are affixed to the opposing forward and aft ends of the cruise plate 27, facing away from the joystick 30. A first electromagnet 24 is angled such that it engages a non-rotating magnetic plate 22 face-to-face when the joystick 30 is rotated to the fully forward position. A second electromagnet 24 is angled such that it engages a non-rotating magnetic plate 22 face-to-face when the joystick 30 is rotated to the fully aft position.

The cruise plate 27 ends may be angled at any degree, so long as the angle allows each electromagnet 24 to engage a corresponding magnetic plate 22. In embodiments where magnetic plates 22 are absent, the electromagnets 24 may be angled such that they may engage with another ferromagnetic surface. In one such example, the electromagnets 24 may engage the body 72 of a control panel 70. In other alternative embodiments, the magnetic plates 22, rather than the electromagnets 24, may be affixed to and rotate with the cruise block.

It should be understood that when the electromagnet 24 is activated, it will hold the joystick 30 in the fully forward or fully aft position until cruise control is either deactivated or the operator applies manual force to overcome magnetic force applied by the electromagnet 24. This cruise control configuration limits maneuverability of a work machine 10. In this example, cruising may be permitted only at maximum velocity, whether in a forward or reverse direction.

Figure 15:
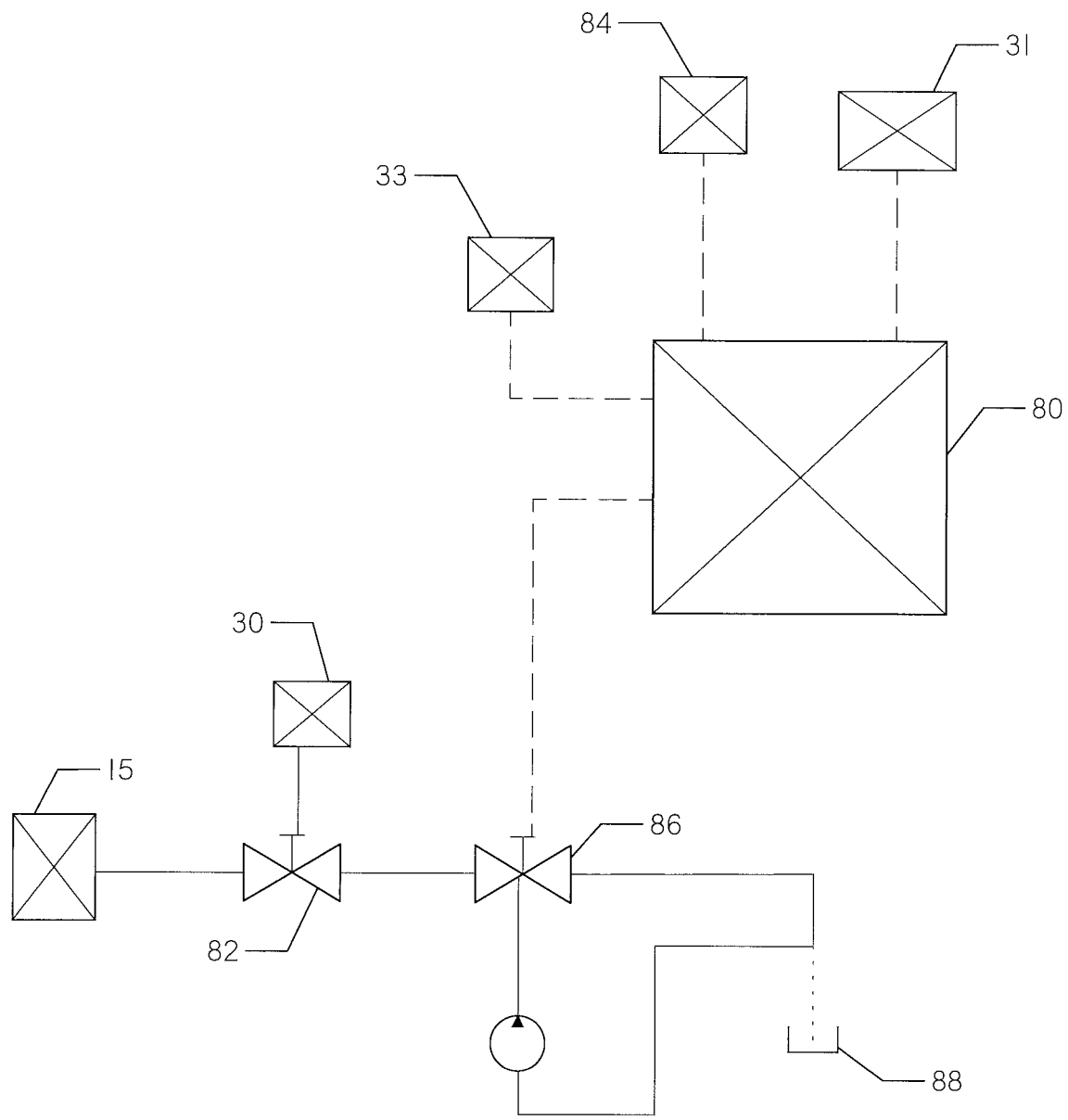
FIG. 15 is a schematic representing a control system and hydraulic fluid flow through a proportional pressure releasing valve for use with the embodiment of FIG. 9.

To improve upon this design, the current invention employs a maximum cruise speed control. Returning to FIG. 9, this control is represented by a cruise dial 31 disposed at the control panel 70, though a slider, touchscreen, or other mechanism could be employed. The dial 31 preferably does not have any control function unless an actuator, such as switch 33, is active. With reference to FIG. 15, the cruise dial 31 and switch 33 are connected to a controller 80. In addition, the work machine 10 has an engine electronic control unit 84 that provides feedback regarding engine operations to the controller.

The valves 29 are part of a pilot steering valve assembly 82. The valve assembly 82 directs flow received at the assembly to the ground engagement system 15 in response to the angular position of the joystick 30. For example, a forward tilt at an angle to the left may cause flow to be directed by the valve assembly 82 such that the left track moves less quickly than the right track, causing the work machine 10 to move forward and to the left.

When the switch 33 is active, the cruise dial 31 causes the controller 80 to activate a proportional pressure reducing valve 86 and the electromagnets 24. The pressure reducing valve 86 reduces the hydraulic flow provided to the pilot steering valve assembly 82 to a maximum value indicated by the position of the dial 31. This may occur by diverting hydraulic flow exceeding the maximum value back to a fluid reservoir 88.

As a result, the valve assembly 82 provides the tracks with a lower maximum fluid pressure, even as the joystick 30 is moved fully forward or aft and held in place by the electromagnets 24. For example, if the cruise dial 31 is set at 20% and the switch 33 activated, the joystick 30 is able to increase the hydraulic flow at joystick positions corresponding to 0% through 20% power. However, after exceeding 20%, excess hydraulic flow through the pressure reducing valve 86 is diverted to the reservoir 88. Accordingly, only 20% of the maximum power can ever be indicated by the valve assembly 82 (as actuated by joystick 30), and the hydraulic flow to the ground engaging members 15 (FIG. 1) does not increase further.

Figure 14:
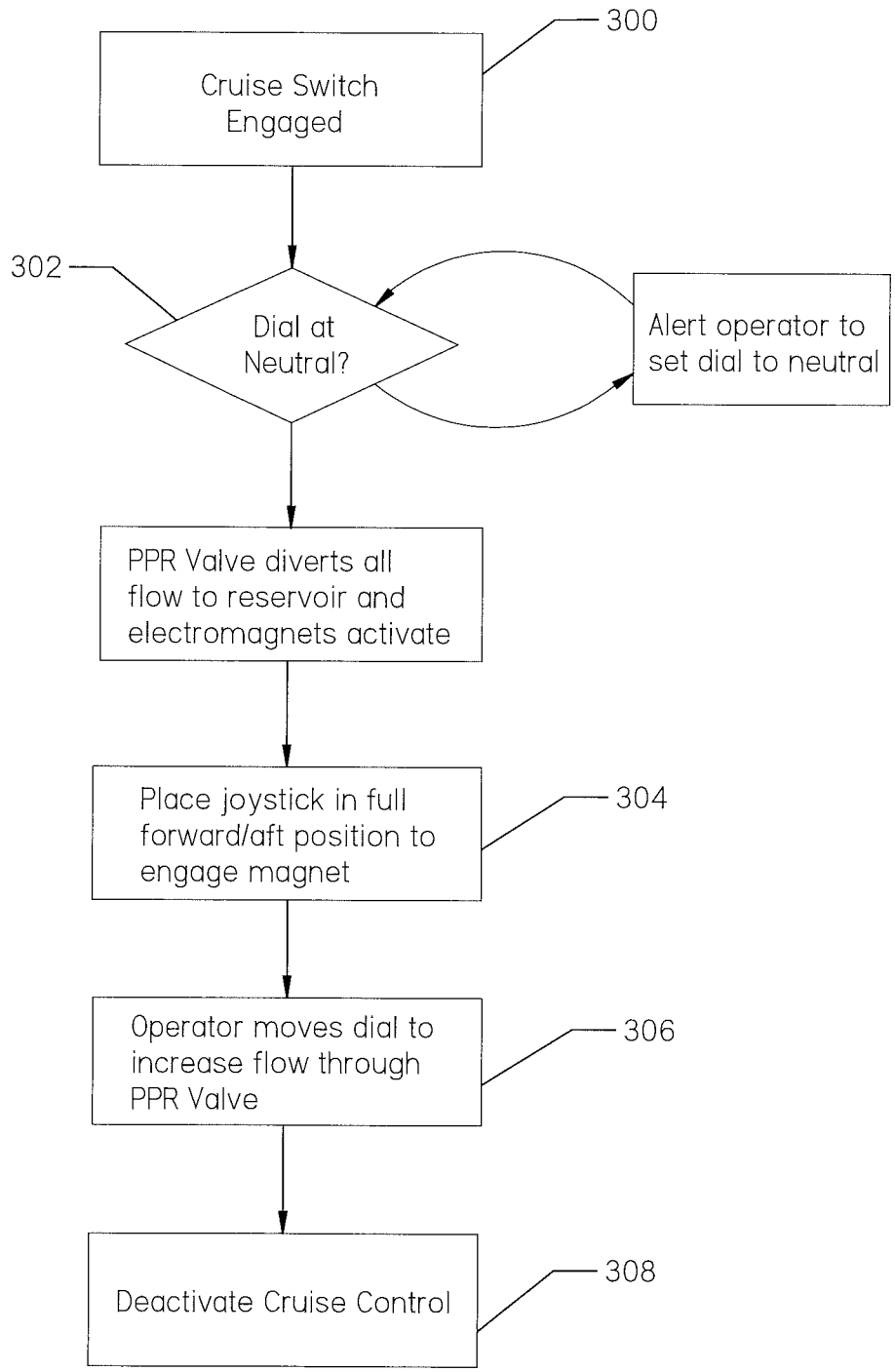
FIG. 14 is a diagrammatic representation of operating logic for a cruise control system using a joystick control.

With reference to FIG. 14, when the cruise control system is activated at 300 by pressing the switch 33 or other actuator. The machine then enters cruise mode. The cruise dial 31 should be confirmed by the machine to be at neutral at 302. If not, an alert may appear. If the cruise dial 31 is at neutral, the electromagnet 24 is activated. With the cruise dial 31 at neutral and the system active, the proportional pressure-reducing valve 86 is diverting all fluid to the reservoir 88. The joystick 30 may then be placed at maximum forward or aft position at 304, engaging the electromagnet 24. At this point, the valve assembly 82 is fully actuated, but because all flow is diverted to the reservoir 88 by pressure reducing-valve 86, no fluid is directed to the ground engaging members.

The operator sets the maximum cruising speed of the work machine 10 by turning the dial 31 to the desired position at step 306. Increasing the position of the dial 31 increases the proportion of fluid flowing from pressure-reducing valve 86 to valve assembly 82. Once set, the operator may turn the dial 31 clockwise or counterclockwise to adjust the cruising speed. Left or right turns may be accomplished by adjusting the joystick 30, causing the work machine 10 to rotate.

Therefore, in cruise mode, the operator may manually control the steering and thrust of the machine 10 or place the joystick 30 in the fully forward 30A or fully aft 30B position, where an electromagnet 24 will maintain the position of the joystick for hands-free travel in the forward or reverse direction. As illustrated in FIG. 9, cruise mode may be deactivated at 308 by the operator at any time by simply toggling the cruise switch 33. This will fully open the pressure-reducing valve 86 and deactivate the electromagnets 24. Other means, such as an emergency stop control, could also be employed to remove the machine 10 from cruise mode.

An additional benefit of the system is an anti-stall feature. As the engine load increases, the controller 80 receives a signal indicative of that load from the engine electronic control unit 84. The controller 80 may then reduce pressure to the pilot steering valve assembly 82 through adjustment of the amount of flow allowed through the proportional pressure reducing valve 86. This action automatically slows the work machine 10 to prevent the engine of the work machine from becoming overloaded and stalling or shutting off.

Additional control mechanisms may be utilized with the system described. In Kukuk et al., U.S. Pat. No. 10,114,404, a hydraulic control system is disclosed wherein a control lever controls a work machine attachment. The control lever is biased towards a neutral position, but may be locked in an operating position. The control lever may be maintained in a locked operating position only so long as the operator remains on the platform of the work machine. Once the operator steps off of the platform, a platform-actuated release mechanism releases the lever from the locked position so that it returns to a neutral position and the attachment ceases operation. U.S. Pat. No. 10,114,404 and U.S. Pat. Pub. No. 2019/0069468 are incorporated herein by reference.

Similarly, the cruise control system of the present invention may only be activated, and remain active, if the operator is standing on the platform 13, which disposes the platform to a first position. If the operator steps off of the platform it moves to a second position, which actuates a release mechanism that turns off the cruise control and deactivates the electromagnets 24, allowing critical levers 20A, 20B, 30 to automatically return to a neutral position. The return to the neutral position may happen after a short period of time, as in Kukuk, or may happen immediately.

Unless otherwise stated herein, any of the various parts, elements, steps, and procedures that have been described should be regarded as optional, rather than as essential. Changes may be made in the construction, operation, and arrangement of the various parts, elements, steps, and procedures described herein without departing from the spirit and scope of the invention as described in the following claims.

The invention claimed is:

1. A system, comprising:
a work machine, comprising:
a control assembly, comprising:
a first lever configured to control a first operating parameter of the work machine and having a range of motion around a neutral position and a bias toward that neutral position;
a second lever configured to control a second operating parameter of the work machine and having a range of motion around a neutral position and a bias towards that neutral position;
a first rotating component carried by or included within the first lever;
a second rotating component carried by or included within the second lever;
a first non-rotating component that maintains a face-to-face relationship with at least a portion of the rotating component throughout the first lever's range of motion; and
a second non-rotating component that maintains a face-to-face relationship with at least a portion of the second rotating component throughout the second lever's range of motion;
in which:
a selected one of the first rotating and first non-rotating components is a first electromagnet having a field strength sufficient, when actuated, to engage the unselected one of the first components and overcome the bias of the lever;
a selected one of the second rotating and second non-rotating components is a second electromagnet having a field strength sufficient, when actuated, to engage the unselected one of the second components and overcome the bias of the second lever; and
the unselected one of the first rotating and first non-rotating components is a body of ferromagnetic material.

2. The system of claim 1 further comprising a switch for activating the magnetic field of the first electromagnet.

3. The system of claim 2 further comprising a control panel supported on the work machine, wherein the switch for activating the magnetic field of the first electromagnet is disposed at the control panel.

4. The system of claim 1 wherein a body of ferromagnetic material is affixed to the first lever.

5. The system of claim 4 wherein the body of ferromagnetic material is affixed to the first lever by a cruise block, the cruise block comprising a body and an internally disposed hole through which the first lever passes.

6. The system of claim 1 further comprising a control panel supported on the work machine, wherein the first electromagnet is affixed to the control panel by a retainer bracket.

7. The system of claim 6 wherein the retainer bracket is flexible, such that activation of the first electromagnet causes the bracket to flex.

8. The system of claim 6 wherein the retainer bracket is rigid, holding the first non-rotating component in continuous contact with the first rotating component.

9. The system of claim 4 further comprising a control panel supported on the work machine, wherein the first electromagnet is affixed to the control panel by a retainer bracket.

10. The system of claim 9 wherein the retainer bracket is rigid, holding the first electromagnet in continuous contact with the magnetic plate.

11. The system of claim 9 wherein the retainer bracket is flexible, such that activation of the first electromagnet causes the bracket to flex.

12. The system of claim 1 in which the field strength of the electromagnet is small enough, when actuated, to permit an operator to manually rotate the control element.

13. The system of claim 1 in which the work machine comprises first and second laterally-spaced ground engagement motive elements, in which:
the first operating parameter is power to the first ground engagement motive element; and
the second operating parameter is power to the second ground engagement motive element.

14. The system of claim 13 in which the first and second laterally-spaced ground engagement motive elements are tracks.

15. A method of operating the system of claim 13, comprising:
moving the first lever to a first position;
moving the second lever to a second position; and
thereafter, activating the first electromagnet and the second electromagnet to hold the first lever and the second lever in their respective positions.

16. The method of claim 15 further comprising:
deactivating the first electromagnet and the second electromagnet.

17. The method of claim 15 wherein:
the first position and the second position are set to maintain the work vehicle in a curve while the first electromagnet and second electromagnet are activated.

18. The method of claim 15, further comprising:
moving the first lever to a third position while the first electromagnet is activated.

19. A system, comprising:
a work machine, comprising:
first and second independently operated motive force elements;
a control assembly, comprising:
first and second manual control elements, each configured to control one of the first and second motive force elements of the work machine, each of the first and second manual control elements having a range of motion around a neutral position and a bias toward that neutral position;
one or more non-rotating components, in face-to-face relationship with at least a portion of the first and second manual control elements throughout its range of motion; and
a first electromagnet carried by or included in the one or more non-rotating components or the first manual control element, having a field strength sufficient, when actuated, to overcome the bias of the first manual control element; and
a second electromagnet carried by or included in the one or more non-rotating component or the second manual control element, having a field strength sufficient, when actuated, to overcome the bias of the second manual control element.

20. The system of claim 19, further comprising an actuator having a first condition and a second condition, wherein the first and second electromagnets are not activated when the activator is in the first position and are activated when the actuator is in the second position.

21. The system of claim 19 in which the one or more non-rotating components comprise a flexible retainer bracket.

22. The system of claim 21 in which the first electromagnet is disposed on the flexible retainer bracket.

23. A method of using the system of claim 19 comprising:
selecting a speed and turn angle for the work machine;
positioning the first and second manual control elements to a position corresponding to the selected speed and turn angle; and
thereafter, activating the first and second electromagnets.

24. The method of claim 23 further comprising:
deactivating the first and second electromagnets.

25. The method of claim 23 further comprising:
after activating the first and second electromagnets, changing the position of one or both of the first and second manual control element to change the speed and turn angle of the work machine.

26. A system comprising:
a work machine having first and second track assemblies;
a control assembly, comprising:
first and second levers, wherein the first lever is configured to control speed and direction to the first track assembly and the second lever is configured to control the speed and direction of the second track assembly, each of the first and second levers having a range of motion around a neutral position and a bias toward that neutral position;
wherein a ferromagnetic material is carried by or included with the lever;
a first electromagnet, disposed in face-to-face relationship with the ferromagnetic material of the first lever; and
a second electromagnet, disposed in face-to-face relationship with the ferromagnetic material of the second lever;
wherein the first electromagnet and second electromagnet each have a field strength sufficient, when actuated, to overcome the bias of the first manual control element.

27. The system of claim 26 in which the ferromagnetic material of each lever is affixed to its respective lever by a cruise block, each cruise block comprising a body and an internally disposed hole through which its lever passes.

28. The system of claim 27 further comprising a retainer bracket, wherein the first electromagnet and the second electromagnet are disposed on the retainer bracket.

29. The system of claim 1 in which the axis of rotation of the first lever and the first rotating component extends through the first non-rotating component.

* * * * *